May 15, 1945.  B. E. SHAW ET AL  2,376,092
COMPENSATED REFRIGERATOR THERMOSTAT
Filed July 14, 1942
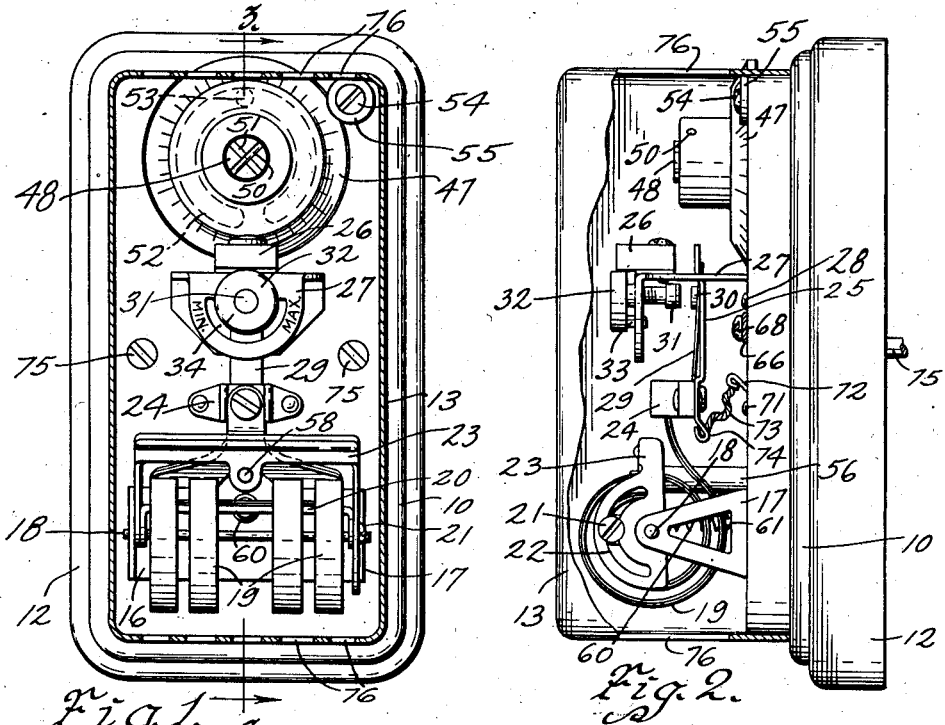
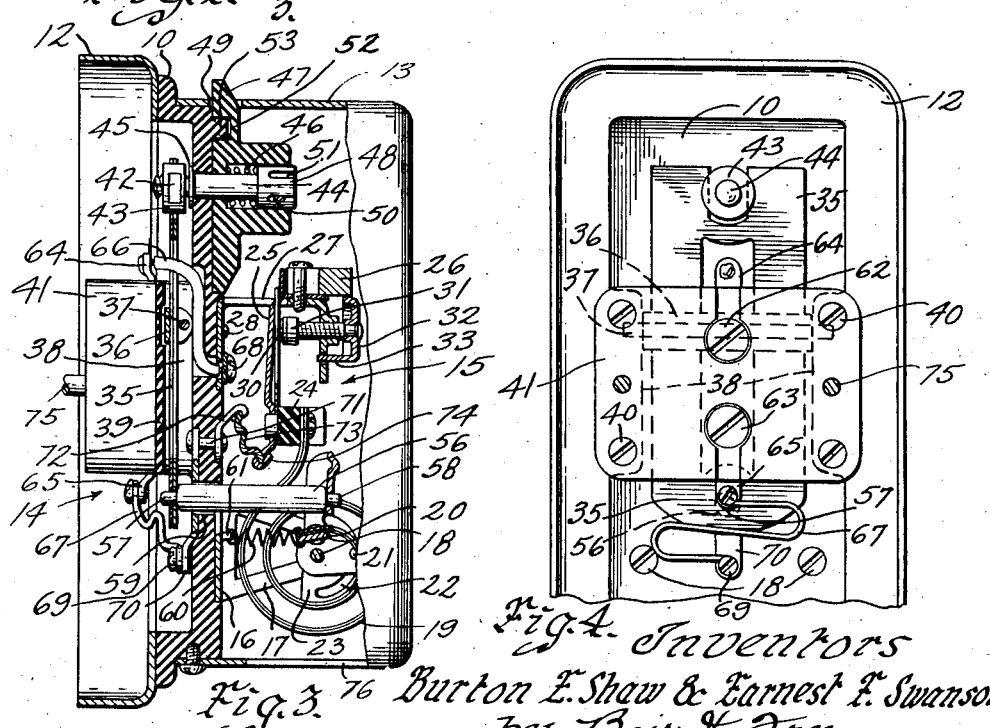
Inventors
Burton E. Shaw & Earnest F. Swanson
by Bair & Freeman
Attys.

Patented May 15, 1945

2,376,092

UNITED STATES PATENT OFFICE 2,376,092

COMPENSATED REFRIGERATOR THERMOSTAT

Burton E. Shaw, Bristol, and Earnest F. Swanson, Goshen, Ind., assignors to Penn Electric Switch Co., Goshen, Ind., a corporation of Iowa Application July 14, 1942, Serial No. 450,862

3 Claims. (Cl. 200—139)

Our present invention relates to a refrigerator thermostat which is compensated against widening of the differential thereof due to heat generated by the passage of current through the elements of the thermostat, and which may be further compensated to secure a "cold anticipation" feature.

One object of the invention is to provide a thermostat for refrigerators or other cooling equipment which is compensated by a simple thermal responsive means associated with an ordinary thermostat.

A further object is to provide a means to reduce the differential of operation of a thermostat for cooling equipment where such thermostat is ordinarily widened as to differential, due to the flow of current through the elements of the control switch.

Still a further object is to provide a simple arrangement of bimetallic strip for compensating purposes, arranged in a compartment of a thermostat and insulated from the normal air flow through the thermostat, the bimetal element being so associated with the thermostatic control mechanism as to compensate it against a wide differential, and so associated with the adjusting means that it serves the purpose of adjusting both the main thermal responsive element of the thermostat and the compensating element.

With these and other objects in view, our invention consists in the construction, arrangement and combination of the various parts of our device whereby the objects contemplated are attained, as hereinafter more fully set forth, pointed out in our claims and illustrated in the accompanying drawing, in which:

Figure 1 is a front view of a thermostat embodying our invention, the casing thereof being shown in section;

Figure 2 is a side elevation of Figure 1 with a portion of the casing broken away;

Figure 3 is a sectional view on the line 3—3 of Figure 1, showing details of construction; and Figure 4 is a partial rear view of our thermostat, showing the compensating means therein.

On the accompanying drawing we have used the numeral 10 to indicate generally a base, which is preferably made of insulating material. A casing 12, which may be made of metal, serves as a sub-base for the base 10, and a casing member 13 serves as an enclosure casing for switch mechanism on the front of the base 10. The casings 10 and 12 divide the thermostatic structure into two compartments, indicated at 14 and 15, respectively. The compartments 14 and 15 are insulated with respect to each other by the base 10.

The usual thermostatic mechanism is provided in the casing 13, such mechanism being of the general type shown in Shaw Patent No. 2,265,495, dated December 9, 1941, and comprises briefly the following elements: A bracket comprising a plate 16 and two upstanding sides 17 is secured to the base 10 as by a pair of screws 18. The sides 17 carry a pivot pin 18 for a coiled bimetallic element 19, which is shown as formed in four separate coils, side by side, to secure sufficient power to operate relatively heavy contacts and thereby directly control electric motors, such as the type used for refrigerant compressors or other cooling equipment. The bimetal element 19 has its inner end secured to a cross-bar 20 of a U-shaped bracket, which has an adjusting screw 21 threaded into it. The adjusting screw 21 extends through an arcuate slot 22 of another U-shaped bracket 23, whereby the brackets 20 and 23 may be adjusted with relation to each other. This is a "factory" adjustment.

The outer end of the bimetal coil 19 is secured to a block of insulation 24 having an armature arm 25 mounted thereon. The arm 25 is adapted to cooperate with a horse-shoe magnet 26 to secure snap action in the usual manner. The magnet 26 is supported on a bracket 27 which, in turn, is secured, as by screws 28, to the base 10.

The arm 25 carries a leaf spring 29 provided with a movable contact 30. The contact 30 is adapted to, at times, engage a stationary contact 31 which is adjustable relative to the bracket 27 by being screw-threaded therein. An adjusting knob 32 is provided for adjusting the range of operation of the switch structure by rotating the screw-carried contact 31, and is provided with an indicating finger 33 movable in an arcuate slot 34 of the bracket 27.

Our compensating mechanism includes a bimetallic strip 35 secured to a U-shaped bracket 36 which, in turn, is pivoted on a pin 37. The pin 37 is carried in a pair of bosses 38, formed in the back of the base, and a plate of insulation 39 is secured to these bosses by screws 40. The screws 40 also secure a terminal block 41 to the bosses 38, with the plate 39 interposed between the terminal block and the bosses.

The upper end of the bimetallic strip 35 is provided with a notch receiving a pair of flattened slots 42 of an adjusting nut 43. The adjusting nut 43 is threaded on a screw 44 having a flange 45 held against the back of the base 10 by a spring 46. The spring 46 is interposed between an adjusting dial 47 and a head 48 on the screw 44. The dial 47 has its periphery knurled and projected through a slot 49 at the top of the casing 13 to a position where it may be readily engaged by the finger of an operator and rotated. The means of connection between the adjusting dial 47 and the screw 44 is a cross-pin 50 and slots 51.

The dial 47 is limited to slightly less than one rotation by a slot 52 therein and a projection 53 from the base 10. The dial, however, may be re-calibrated relative to the screw 44 by pulling it outwardly against the bias of the spring 46 after the casing 13 is removed and after a holding screw 54 and a washer 55 have been removed. This will disassociate the cross-pin 50 from one of its slots 51, whereupon the dial may be rotated a quarter turn, either right-hand or left-hand, as required, and the cross-pin reentered in one of the slots.

The lower end of the bimetallic strip 35 is operatively connected with the bimetal coil 19 to adjust it for compensating purposes by means of a thrust pin 56. The thrust pin 56 has reduced ends 57 and 58 passing through perforations of the bimetallic strip 35 and the bracket 23 respectively. The pin 56 extends loosely through an opening 59 in the base 10. The bracket 23 and the strip 35 are retained in engagement with the shoulders of the pin 56 by a spring 60 connected between the cross-piece 20 and an ear 61 formed on the bracket 16.

The terminal block 41 has terminal screws 62 and 63 mounted therein. Terminal lugs 64 and 65 have the screws 62 and 63 threaded therein, and the terminal lugs are connected respectively to a lead 66 and a heater wire 67. The lead 66 connects by a screw 68 to the bracket 27 so that the current flows through the bracket to the stationary contact 31. The heater 67 is connected to a screw 69 threaded in a bracket 70 which, in turn, is connected by a rivet 71 with a lug 72. The lug 72 is connected by a flexible pig-tail connection 73 to a lug 74 of the armature arm 25, whereby current is carried from the movable contact 30. The terminals 62 and 63 may then be connected in series with a refrigerant compressor motor or other device, electrically operable to effect the operation of cooling equipment.

Our thermostat may be connected to a wall of a room or of a refrigerated space, by a pair of mounting screws 75 extending through the base 10 and through the plate 39 and the terminal block 41 into the surface of the wall.

Practical operation

In the operation of our compensated refrigerator thermostat, the thermostatically controlled bimetal coil 19 operates in the usual manner, uncoiling when temperature lowers, and thereby tending to open the switch from the position of Figure 3 to the position of Figure 2. When temperature rises, the coil tends to contract for closing the circuit, thereby operating the refrigerating mechanism or the cooling mechanism controlled thereby, and, thereupon, reduce the temperature ambient to the thermostat. The ambient temperature finds its way to the bimetal coil 19 by air currents passing through openings 76 in the top and bottom of the casing 13. The action of the coil 19, however, is modified by two distinct factors. One is the heat generated in the compartment 15, due to the flow of current through the lead 66, the bracket 27, the contacts 30 and 31, the leaf spring 29, the pig-tail 73 and the lug 72. This heat tends, upon closure of the contacts, to effect a further contraction of the bimetal coil 19, thereby holding the contacts 30 and 31 more tightly engaged, and resulting in the necessity of a lower temperature than otherwise having to effect the bimetal coil 19 before it uncoils sufficiently to open the contacts. This prolongs the operation of the refrigerating or cooling mechanism, or, in other words, widens the differential of operation of the control mechanism, and is undesirable.

To compensate for the undesirable widening of the differential we have provided the bimetallic strip 35 in a compartment 14, insulated from the compartment 15 so that it is not subjected to ambient air temperature, and we further provide the heater 67 for the purpose of raising the temperature in the compartment 14 surrounding the bimetallic strip 35 a predetermined degree so that the bimetal element will warp whenever current flows through the control structure. The direction of warpage is left hand at the lower end of the bimetal strip so as to permit the pin 56 to be moved toward the left by the spring 60, thereby tending to open the contacts 30 and 31. The result is a narrowing of the differential so as to compensate for the tendency for it to be widened by heat generated in the compartment 15 by current flow through the elements of the control mechanism therein.

We prefer to more than compensate for the widening of the differential in the compartment 15 so as to secure a cold anticipation feature by anticipating a drop in temperature after the control switch is closed, and thereby allowing the switch to open at a temperature a few degrees higher than it otherwise would if the temperature ambient to the coil 19 were the only consideration. Thus, by providing the bimetal element 35 responding to current flow and not to ambient temperature, and mechanically connecting it with the temperature responsive means in the compartment 15 so that it operates it in the proper direction when current flows through the compartment 14, we are able to compensate for widened differential, and go further in order to reduce the differential to practically zero, or even provide a negative differential if desired. Any degree of compensation or over-compensation can be secured by the proper size of the wire 67 with respect to the current flow through the control switch, as determined by the size of the motor or other electric equipment being controlled. In some installations it may not even be necessary to provide the heater 67, if there is sufficient resistance to current flow in the circuit carrying elements within the compartment 14 to generate the required heat.

Our compensation mechanism for a refrigerator thermostat is particularly adaptable for switches for directly controlled refrigerant compressor motors, whereas, heretofore, relays have been used, due to the heavy flow of current through the control switch if a relay is not used, widening the differential to an undesirable degree. With our arrangement a motor controlling thermostat is possible without an undesirably wide differential of operation of the switch mechanism, and any degree of reduction of the differential desired may be secured.

Some changes may be made in the construction and arrangement of the parts of our device without departing from the real spirit and purpose of our invention, and it is our intention to cover by our claims any modified forms of structure, or use of mechanical equivalents, which may be reasonably included within their scope.

We claim as our invention:

1. A refrigerator thermostat comprising a base of insulating material, a casing on one side thereof having temperature responsive control means therein and having openings for the passage of air therethrough, a second and closed casing on the other side of said base having temperature responsive compensating means therein, said temperature responsive control means being subjected to ambient temperature flowing through its casing and to heat generated by the passage of current through said temperature responsive control means, said temperature responsive compensating means being responsive only to heat generated by the flow of current through said thermostat, and a thrust pin of insulating material extending through said base for mechanically and non-thermally connecting said temperature responsive compensating means with said temperature responsive control means to readjust the control means and thereby lower its differential of operation in response to heat generated by the flow of current through said thermostat.

2. In a compensated thermostat for cooling mechanism, a base, a casing on each side of said base, said base thermally separating said casings from each other, thermostatic control mechanism in one of said casings, said casing having openings therein, said thermostatic control mechanism being responsive to the temperature of air chilled by said cooling mechanism, and means for compensating said thermostatic control mechanism against remaining for a prolonged period of time in position calling for lowering of the temperature of such air comprising thermal responsive means in said other casing, said other casing being closed, said thermal responsive means being subjected to heat produced in said closed casing by current flow through said thermostat, and a thrust pin extending through said base for transmitting movement from said thermal responsive means to said thermostatic control mechanism for modifying the action of the control mechanism to cause it to anticipate a lowering of such air temperature.

3. A thermostat comprising a base of insulating material, a pair of casings on opposite sides thereof thermally insulated from each other by said base, a temperature responsive control means in one of said casings, a temperature responsive compensating means in the other one, the interior of said first casing being subjected to ambient temperature and to heat generated by passage of current through the temperature responsive control means therein, said second casing being closed and thereby responsive only to heat generated by the flow of current therethrough, and a heat insulating thrust connection through said base from said temperature responsive compensating means to said temperature responsive control means to change the adjustment of the latter in a direction tending to open the circuit controlled thereby due to a rise in temperature in said second casing.

BURTON E. SHAW.
EARNEST F. SWANSON.